United States Patent [19]
Vilkomerson

[11] Patent Number: 5,713,362
[45] Date of Patent: Feb. 3, 1998

[54] HIGHER-ORDER QUADRATURE DRIVEN DIFFRACTION GRATING DOPPLER TRANSDUCERS

[75] Inventor: David Vilkomerson, Princeton, N.J.

[73] Assignee: Echocath, Inc., Monmouth Junction, N.J.

[21] Appl. No.: 699,229

[22] Filed: Aug. 19, 1996

[51] Int. Cl.[6] .................................................. A61B 8/06
[52] U.S. Cl. ............................... 128/661.08; 128/662.03
[58] Field of Search ........................... 128/661.07, 661.08, 128/661.09, 661.1, 662.03, 662.04; 310/334, 335; 359/58

[56] References Cited

U.S. PATENT DOCUMENTS

| | | | |
|---|---|---|---|
| 4,850,682 | 7/1989 | Gerritsen | 359/58 |
| 5,488,953 | 2/1996 | Vilkomerson | 128/662.03 |
| 5,540,230 | 7/1996 | Vilkomerson | 128/662.04 |

*Primary Examiner*—George Manuel
*Attorney, Agent, or Firm*—Plevy & Associates

[57] ABSTRACT

A higher-order quadrature driven diffraction grating ultrasonic transducer and mode of operation, useful for determining the velocity of a fluid under investigation. The diffraction grating of the transducer is easier to fabricate compared to prior art first order quadrature driven diffraction grating ultrasonic transducers because the higher order design allows the grating to be expanded. The higher order design also eliminates the need to vary the frequency or phase of pulse generator used to drive the transducer in order to produce multiple beams needed for fluid velocity measurements.

27 Claims, 2 Drawing Sheets

HIGHER-ORDER QUADRATURE DRIVEN DIFFRACTION GRATING DOPPLER TRANSDUCERS

FIELD OF THE INVENTION

The present invention relates to ultrasonic transducers and more particularly to a Doppler transducer with a higher-order quadrature driven diffraction grating for measuring the velocity of a fluid flowing through a lumen independently of the transducer's orientation.

BACKGROUND OF THE INVENTION

It is important in the practice of modern medicine, to be able to determine the velocity of bodily fluids, particularly blood, which flow through vessels or through connected instrumentation. Conventional ultrasonic transducers employing Doppler measurement techniques are commonly used for this purpose. See Atkinson and Woodcock, *Doppler Ultrasound and Its Use In Clinical Measurement*, Academic Press, London (1982). The term "Doppler," is used here in the broad sense to describe all the techniques for measuring the variation with time of backscattered ultrasound along a beam to determine the velocity component along the beam. In addition to what is conventionally considered Doppler, i.e., the change in phase of backscattered ultrasound as a result of movement, present fluid velocity measuring methods also use newer time-domain techniques that use cross-correlation to determine the velocity along the beam, see Hoeks et al, "Comparison of the Performance of the RF Cross-Correlation and Doppler Auto-Correlation Technique to Establish the Mean Velocity", in *Ultrasound in Medicine and Biology* 19, page 727 (1993). All such techniques measure the velocity component along the beam. In order to determine the true fluid velocity, the angle between the beam and the velocity vector has to corrected. The results for cross-correlation techniques, as well as for the Doppler techniques, depends upon the frequency in use. For all such techniques, one can obtain two equations, relating the measured effects of changing frequency in terms of the observed velocity and angle, and then determine both velocity and angle between the measuring ultrasound beam and the velocity vector. For ease of use herein, reference to the term "Doppler" will signify reference to all methods that use time variation of the backscattered ultrasound along a beam to measure the velocity of a fluid at an unknown angle to the beam.

As is well known in the art, ultrasonic transducers are devices which convert energy between electrical and acoustic forms. See L. Kinsler et al., *Fundamentals of Acoustics*, John Wiley & Sons (3d ed. 1982). By directing an insonifying beam of ultrasonic energy towards a fluid under investigation at a known angle, and measuring the frequency shift of the back-scattered ultrasound energy, the velocity of the fluid under investigation can be determined. This is because the Doppler shift in frequency is proportional to the component of the velocity vector that is parallel to the insonifying beam. The well-known equation for finding the velocity v of a fluid from the Doppler shift frequency $f_d$ is $$v = .5 \cdot f_d \frac{c}{f \cdot \cos \theta} \quad (1)$$

where c is the velocity of sound in the fluid, f is the frequency of the insonifying beam and θ is the angle between the insonifying beam and velocity vector.

A problem commonly encountered when employing conventional Doppler techniques to measure the velocity v of a fluid under investigation is that typically, the insonifying beam insonifies the fluid at an unknown angle. Without knowledge of this angle, equation (1) cannot be solved. Therefore, in such situations, employing a single insonifying beam to determine the velocity of the fluid of interest from equation (1) is impossible since there are two unknowns in the equation (1), i.e., the velocity v and the angle θ.

One method for eliminating the foregoing problem of determining the angle θ in question involves employing two transducers at a known angular offset of ±α and to insonify the fluid under investigation at the respective angles of θ+α and θ−α, thus, allowing the two following equations (2) in the two unknowns v and θ to be written, and by solution of two equations in two unknowns, permitting v to be determined regardless of the value of θ:

$$v = .5 \cdot f_{d1} \frac{c}{f \cdot \cos(\theta + \alpha)} \quad v = .5 \cdot f_{d2} \frac{c}{f \cdot \cos(\theta - \alpha)} \quad (2)$$

See Overbeck et al, "Vector Doppler: Accurate Measurement of Blood Velocity in Two Dimensions", *Ultrasound in Medicine and Biology*, Volume 18, page 19 (1992). However, using two conventional transducers at two angles to the fluid flow is difficult, as transducers are thick, inflexible, bulky, difficult to implant, and too big to be useful on a catheter or a guidewire. Thus, the use of pairs of transducers, while possible, is rare.

In the field of optics, diffraction is a well-known technique for producing multiple optical beams based on the interference effects of waves. Likewise, diffraction principles can also be applied in ultrasound as a way to produce multiple ultrasonic beams for performing Doppler measurements of the velocity of blood or other fluids. In particular, U.S. Pat. No. 5,488,953 entitled DIFFRACTING DOPPLER-TRANSDUCER issued to David Vilkomerson on Feb. 6, 1996 and U.S. Pat. No. 5,540,230 entitled DIFFRACTING DOPPLER-TRANSDUCER issued to David Vilkomerson on Jul. 30, 1996, wherein both patents are assigned to EchoCath, Inc., the assignee herein, disclose a single transducer which employs diffraction principles to produce multiple insonifying beams at known and controllable angles thus, permitting the absolute velocity of a fluid under investigation to be determined using Doppler measurement techniques. More specifically, the transducer disclosed therein is a thin and flexible $1^{st}$-order Quadrature Driven Grating transducer. Such a transducer is easy to implant and eliminates the need for multiple cables and elements as required by the prior art. The Quadrature transducer includes a grating-like-structure comprised of an array of line transducer elements which are driven by a pulse generator. The transducer elements are arranged in repeating patterns of alternately polarized strips or fingers of PVF2 piezoplastic or PZT piezoelectric ceramic transducer material that are formed on a common substrate surface by conventional photolithographic techniques. Each repeating pattern defines one spatial period of a diffracting pattern where d is the distance of the repeat pattern.

The transducer described in U.S. Pat. No. 5,488,953, however, has a limited frequency range in which the transducer can be used. More specifically, in order for such a transducer to be used at high frequencies such as 15 MHz, a very fine grating-like-structure must be fabricated in the ceramic transducer material which is extremely difficult and costly using existing ceramic fabrication techniques. For example, to achieve a 30° beam at 15 MHz, where the wavelength, λ, is 0.1 mm and each repeat pattern of the quadrature-driven array contains four spaced apart polarized strips or fingers, using the equation taught in U.S. Pat. No. 5,488,953; sin θ=λ/d, one can determine the pattern repeat distance d:

d=0.1 mm/sin 30°~200 microns.

Since a finger and its associated spacing is equal to ¼ of d, only 50 microns are available for each finger/space of the repeat pattern.

Additionally, as described in U.S. Pat. No. 5,488,953, two beam directions are needed for angle-independent Doppler operation. This requires either the frequency or the phase of the voltage applied to the transducer to be varied which complicates the operation thereof.

Accordingly, there is a need for an improved diffracting Doppler transducer for use in measuring the absolute velocity of a fluid under investigation that is substantially easier to construct and operate than present diffracting Doppler transducers.

SUMMARY OF THE INVENTION

An ultrasonic transducer apparatus for measuring the velocity of a fluid flowing through a lumen, comprising an ultrasonic diffractive transducer of a predetermined order greater than 1 and pulse generating means for driving the transducer. The transducer has a diffracting structure arranged in a repeating pattern of a given repeat pattern distance. The pulse generating means for drives the transducer at a given frequency and phase angle to cause the transducer to transmit at least two differently angled diffracted ultrasonic beams, whereby the ultrasonic beams are used by the ultrasonic transducer apparatus to measure the velocity of the fluid.

DETAILED DESCRIPTION OF THE INVENTION

Figure 1A:
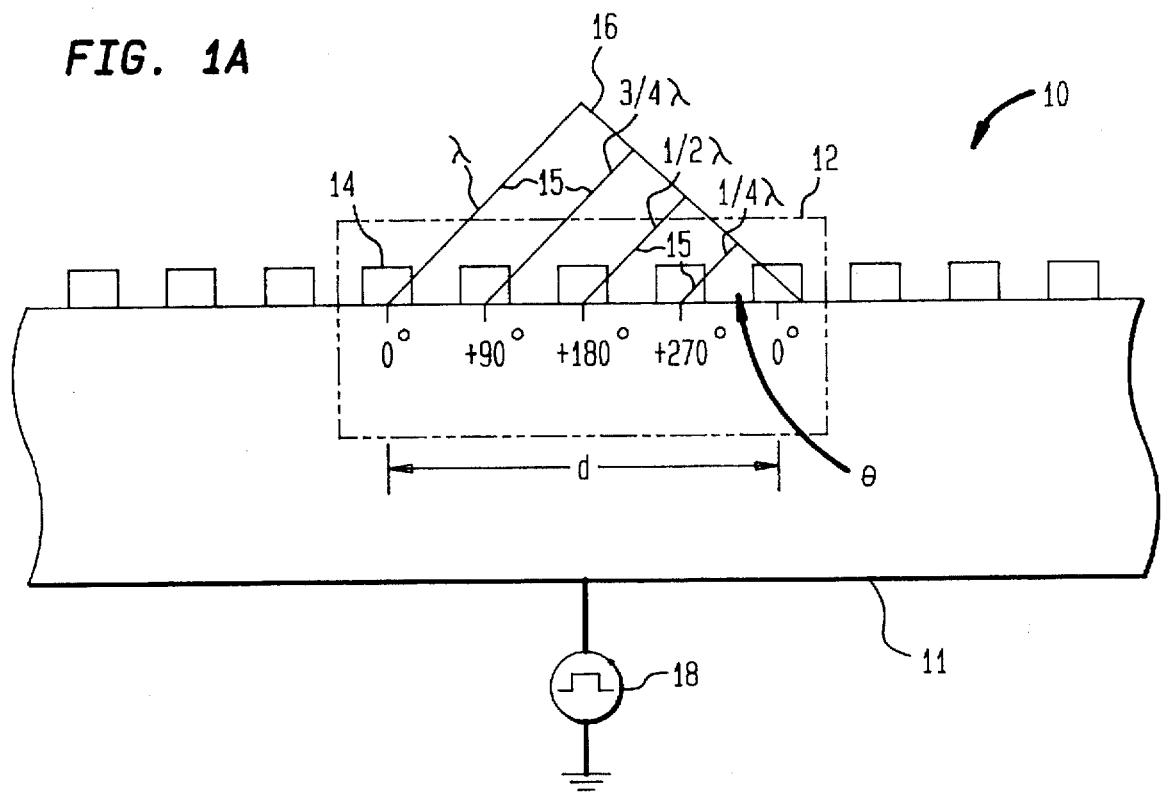
FIGS. 1A and 1B show a prior art first order quadrature driven diffraction grating ultrasonic transducer.
Figure 1B:
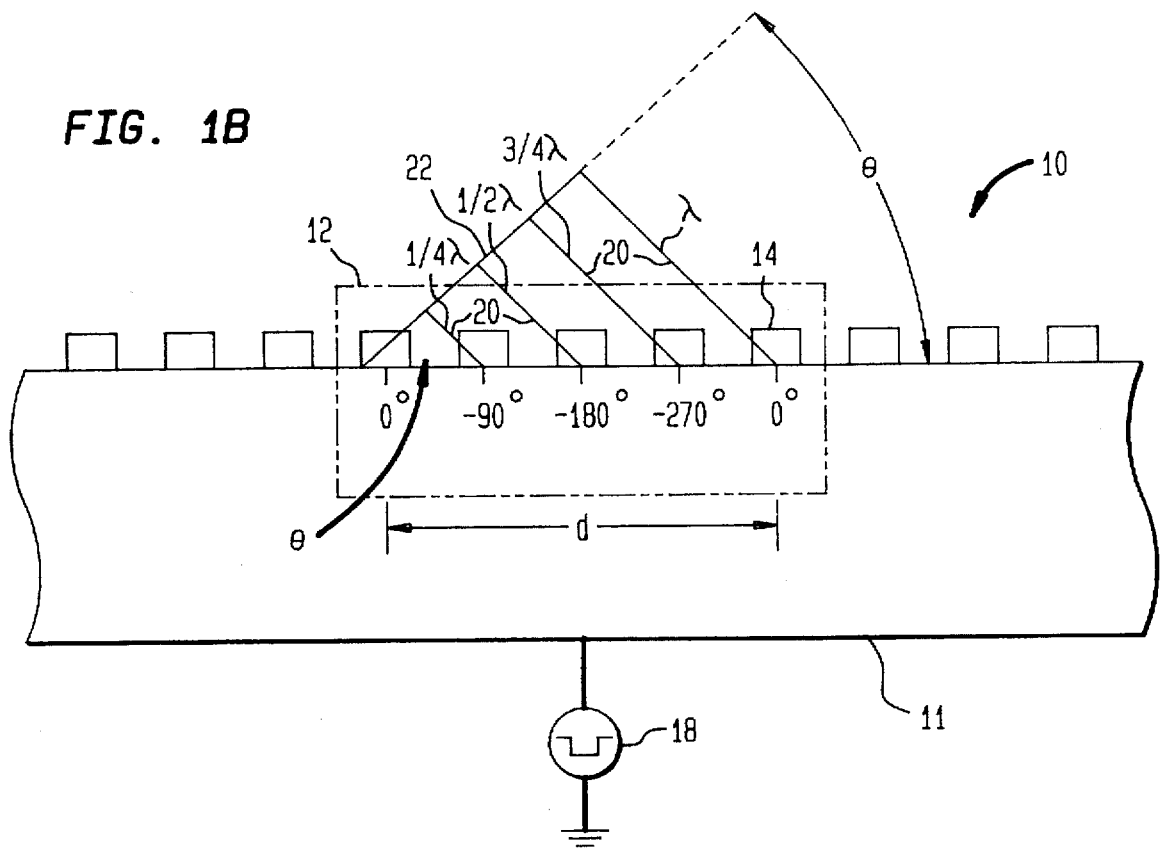

Referring to FIG. 1A, a prior art diffracting $1^{st}$-order Quadrature Driven Grating transducer 10 (1QGT) such as the one described in either U.S. Pat. No. 5,488,953 or U.S. Pat. No. 5,540,230, is schematically shown. The 1QGT 10 uses a repeating pattern 12 of four line transducer elements 14 which have a pattern repeat distance d as depicted in FIG. 1A. The 1QGT 10 operates on the general principle that each repeat pattern 12 of transducer elements 14, having a repeat pattern distance d, produces wavelets 15 which are exactly one wavelength ($\lambda$) away in phase from each other and produce an insonifying beam whose wavefront 16 moves in a direction defined by sin $\theta=\lambda/d$, or in other words the wavelets 15 reinforce each other in the direction sin $\theta=\lambda/d$ only. This is accomplished by driving the transducer elements 14 in a positive 90° phase angle quadrature using a pulse generator 18. The transducer elements 14 of the 1QGT 10 produce respective in-phase wavelets 15 having wavelengths of ¼$\lambda$, ½$\lambda$, ¾$\lambda$, and 1$\lambda$. Since the wavelets 15 are in-phase with each other they reinforce each other, to produce the insonifying beam wavefront 16 in the direction defined by sin $\theta=\lambda/d$. In other directions, the wavelets do not reinforce each other, and thus, produce no insonifying beam. In order to produce a second insonifying beam for angle-independent Doppler operation, either the frequency or the phase angle of the voltage applied to the transducer elements 14 by the pulse generator 18 must then be changed. FIG. 1B depicts the 1QGT 10 of FIG. 1A driven in a negative 90° phase angle quadrature to produce a wavelets 20 which reinforce each other to produce a second insonifying beam wavefront 22.

Figure 2:
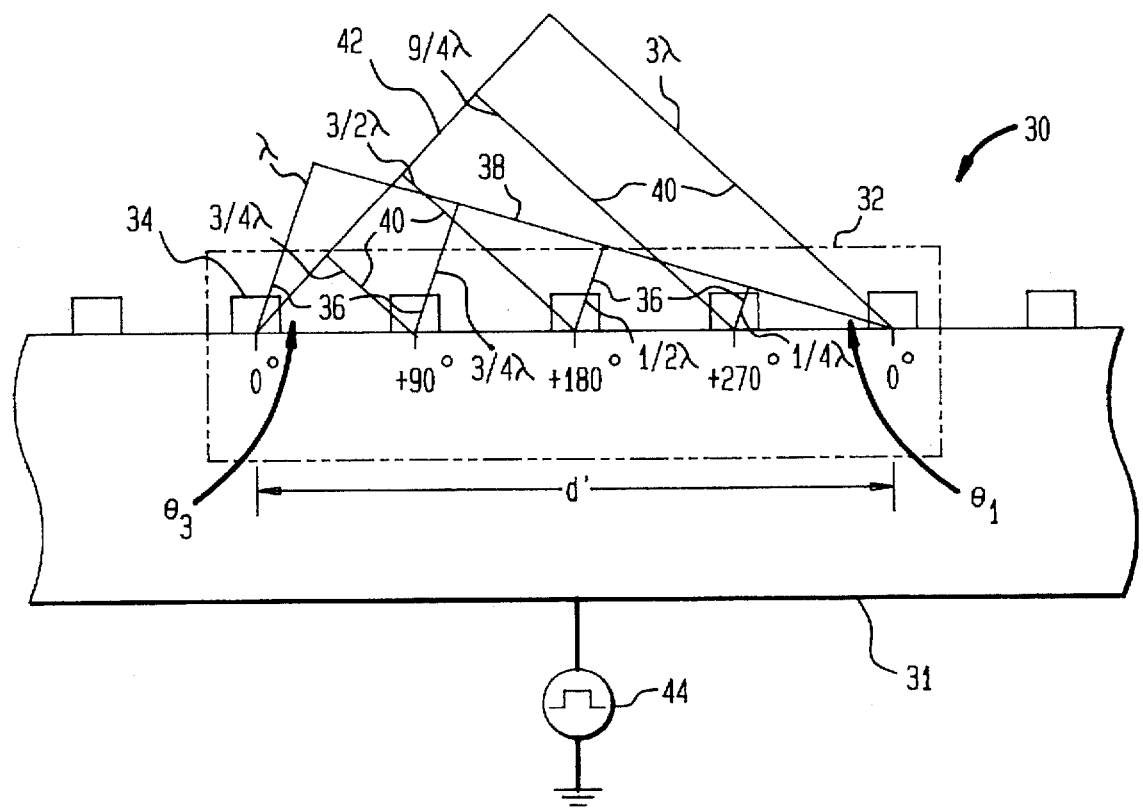
FIG. 2 shows an embodiment of a higher-order quadrature driven diffraction grating ultrasonic transducer according to the present invention.

FIG. 2, depicts a Higher-Order Quadrature Driven Grating transducer 30 (HQGT) according to the present invention. The HQGT 30 has a repeating pattern 32 of preferably four line transducer elements 34 which define a pattern repeat distance d. Although the HQGT 30 is shown to have four line transducer elements per repeat pattern, transducers having repeating patterns which include more or less than four transducer elements per repeat can also be used if desired. The transducer elements 34 are fabricated from alternately polarized strips of a plastic piezoelectric material such as PVF2 or other piezoplastic polymers, which are disposed on a substrate 31 of plastic piezoelectric material such as PVF2 or other piezoplastic polymers, or piezoceramic, such as PZT, similarly disposed. Since the structure of the line transducer elements 34, is similar to the transducer elements of the 1QGT of FIGS. 1A and 1B, details concerning the fabrication of such elements and other general information can be had by referring to U.S. Pat. No. 5,488,953 and U.S. Pat. No. 5,540,230, wherein the entire disclosure of both patents are incorporated herein by reference. The HQGT 30 is driven in a 90° phase angle quadrature by a pulse generator 44 or any other conventional source of power, according to the equation:

$$\sin \theta = n\lambda/d \tag{3}$$

Using sin $\theta=n\lambda/d$, the transducer elements 34 of the HQGT 30 produce wavelets which are in phase with each other in direction of the insonifying beam and separated by n wavelengths. For example, when n=3, the HQGT can produce wavelets which reinforce each other and are separated by 3 wavelengths instead of 1 wavelength as in a prior art 1QGT.

More specifically, for all odd numbered orders, i.e., when n is equal to 3, 5, 7, etc., the HQGT 30 produces wavelets 36 and 40 which reinforce each other to produce two or more beams without the need for altering the frequency or the phase of the pulse generator 44 which drives the HQGT 30. For example, if n=7, the HQGT 30 produces beams at: $\theta$=arcsin 1$\lambda$/d, $\theta$=arcsin 3$\lambda$/d, $\theta$=arcsin 5$\lambda$/d, and $\theta$=arcsin 7$\lambda$/d. It should be noted that for all even numbered orders, i.e., when n is equal to 2, 4, 6, etc., the HQGT produces wavelets which cancel each other, producing no insonifying beam.

In the preferred embodiment of the present invention as shown in FIG. 2, n is equal to 3. Accordingly, the HQGT 30 produces a first diffracted insonifying beam having a wavefront 38 at $\theta_1$=arcsin $\lambda$/d and a second diffracted insonifying beam having a wavefront 42 at $\theta_3$=arcsin 3$\lambda$/d.

The diffracted beams 38 and 42 produced by the HQGT are directed towards a moving fluid under investigation. The first beam insonifies the fluid at a first point and the second beam insonifies the fluid at a second point. The fluid backscatters the diffracted beams back towards the HQGT as backscattered diffracted beams. One can determine the velocity v of the fluid, by measuring the frequency shift of the reflected beams using the two equations (2), as described above.

Figure 3:
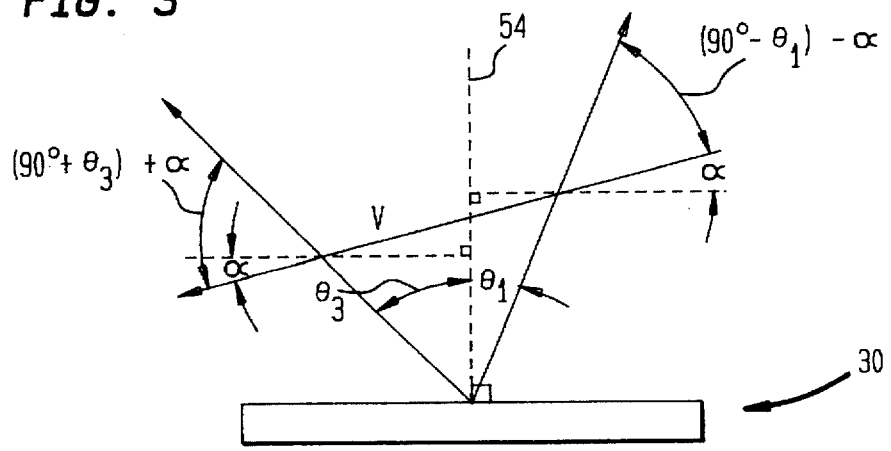
FIG. 3 shows a schematic representation of the transducer shown in FIG. 2 as it is used to measure a fluid under investigation.

The following discussion will show how the HQGT 30 of the present invention produces two Doppler frequencies for a given velocity vector. Referring to FIG. 3 there is shown a schematic representation of a 3rd order (n=3) HQGT 30 measuring fluid flow such as blood through a blood vessel, at a flow velocity v and an arbitrary angle $\alpha$ relative to planes 50 and 52 which are parallel to the HQGT 30. The beam angle $\theta_1$ represents the angle of the first diffracted insonifying beam 38 on one side a perpendicular 54 to the HQGT 30 and the beam angle $\theta_3$ represents the angle of the second diffracted insonifying beam 42 on the other side the perpendicular 54. The beam at the low angle $\theta_1$=arcsin $\lambda/d$ produces a first Doppler shift frequency $fd_1$ from a first reflected beam:

$$fd_1 = 2f_o/c \, v \, \cos(90° - \theta_1 - \alpha)$$

and; the beam at high angle $\theta_3$=arcsin $3\lambda/d$ produces a second Doppler shift frequency $fd_3$ from a second reflected beam:

$$fd_3 = 2f_o/c \, v \, \cos(90° - \theta_3 + \alpha)$$

where c=the velocity of sound, and $f_o$ is the insonifying frequency of the beams. Since the relationship of the two beams is known, the velocity vector v and the angle $\alpha$ of the velocity vector v relative to the transducer can be calculated from the following equations:

$$v = \frac{c}{2} \frac{\sqrt{(2\cos\theta_1 fd_3 fd_1 \cos\theta_3 + fd_3^2 + fd_1^2 - 2\sin\theta_1 fd_3 fd_1 \sin\theta_3)}}{f_o(\sin\theta_3\cos\theta_1 + \cos\theta_3\sin\theta_1)}$$

$$\alpha = \arctan\frac{(-\sin\theta_1 fd_3 + fd_1\sin\theta_3)}{(\cos\theta_1 fd_3 + fd_1\cos\theta_3)}$$

As should be apparent, only a single mode of operation is required for the calculation of the vector velocity v and the angle $\alpha$ using the HQGT 30 of the present invention. This is a substantial improvement over the 1QGT of the prior art which requires at least two different modes of operation. i.e., where the transducer is driven at either an altered frequency or altered phase, to produce multiple beams of a known relationship that allow the calculation of velocity and angle. Consequently, the HQGT 30 is simpler to operate than a prior art 1QGT.

Another advantage which relates to the use of a higher order quadrature grating structure is that the structure of the HQGT 30 requires less free spacing of the transducer elements 34 as compared to a prior art 1QGT. In particular, as can be from equation 3 above, in order to achieve a given insonifying beam angle $\theta$, the HQGT 30 provides $\theta$=arcsin $(3\lambda/d)$ rather than $\theta$=arcsin $(\lambda/d)$ for a prior art 1QGT. Accordingly, the repeat pattern distance for a 3rd order (n=3) HQGT is:

$$\lambda/d = 3\lambda/d'$$

$$d' = 3d$$

This allows the repeat pattern for the HQGT 30 to be three times the size of the repeat pattern of 1QGT. Consequently, when the HQGT is used to achieve the same 30° beam at 15 MHz, as was used above in the discussion of the prior art 1QGT, where the wavelength, $\lambda$, is 0.1 mm, and the pattern repeat distance is:

3(d=0.1 mm/sin 30°~200 microns)

d'~600 microns each transducer element 34 and its associated spacing will be equal to ¼ of d, or 150 microns. This makes the HQGT substantially easier to fabricate using existing techniques that a prior art 1QGT.

As stated above, the preferred HQGT is a 3rd order (n=3) HQGT. While higher order HQGT's will produce more beams, i.e., fifth order (n=5) HQGT's will produce 3 beams, seventh order (n=7) will produce 4 beams, etc., only 2 beam are necessary for determining velocity and angle of a fluid under investigation. The more than 2 beam HQGT has more than one beam on a given side of the perpendicular which separates the HQGT in FIG. 3, which may lead to difficulty in separating the contributions of each beam for fluid flows of wide velocity. In the case of the 3rd order HQGT of FIGS. 2 and 3, the Doppler frequencies from the low angle beam are shifted up in frequency and the Doppler frequencies from the high-angle beam are shifted down in frequency, making it easy to distinguish. For a fifth order HQGT, there are two beams on the same side of the perpendicular, which for broad range of interrogated velocities could lead to overlap in the Doppler frequencies of those beams.

However, it may be desirable to expand the spacing of the transducer elements when the HQGT is to be used in very high frequency applications, in order to make the fabrication of the HQGT easier. In such circumstances, a higher order HQGT which dilates the pattern spacing proportionately to the order, would be desirable, despite the above stated difficulties with more than 2 beam HQGTs.

It will be understood that the embodiments described herein are merely exemplary and that a person skilled in the art may make many variations and modifications to the described embodiments utilizing functionally equivalent elements to those described. Any variations or modifications to the invention described hereinabove are intended to be included within the scope of the invention as defined by the appended claims.

What is claimed is:

1. A method of determining a velocity of a fluid flowing through a lumen, comprising the steps of:

placing an ultrasonic transducer apparatus of a predetermined order greater than 1, proximate to said lumen, said ultrasonic transducer apparatus including a diffracting structure comprising a repeat pattern of vibrating elements fabricated from a piezoelectric material, said repeat pattern having a given repeat pattern distance;

exciting said ultrasonic transducer apparatus at a given frequency and phase angle to enable said transducer apparatus to emit at least two differently angled diffracted ultrasonic beams of a given wavelength;

measuring time changes as said at least two differently angled diffracted ultrasonic beams are backscattered by said fluid back towards said diffracting structure to determine said velocity of said fluid.

2. The method according to claim 1, wherein said step of exciting includes exciting said ultrasonic transducer according to a sinusoidal function proportional to said predetermined order of said transducer.

3. The method according to claim 1, wherein said step of exciting includes exciting said ultrasonic transducer according to the equation:

$$\sin\theta = n\lambda/d,$$

where $\theta$ is the desired angle of each of said at least two differently angled beams, n is said order of said traducer, $\lambda$ is the wavelength of each of said at least two differently angled beams, and d is said given repeat pattern distance.

4. The method according to claim 3, wherein n is equal to an odd number.

5. The method according to claim 3, wherein n is equal to 3.

6. The method according to claim 1, wherein said step of measuring the time changes as said at least two differently angled diffracted ultrasonic beams are backscattered by said fluid, produces at least two Doppler shift frequencies.

7. The method according to claim 6, wherein one of said at least two Doppler shift frequencies is calculated according to the equation:

$$fd_1 = 2f_o/c \; v \; \cos(90° - \theta_1 - \alpha)$$

and the other of said two Doppler shift frequencies is calculated according to the equation:

$$fd_3 = 2f_o/c \; v \; \cos(90° - \theta_3 + \alpha)$$

where c=the velocity of sound, and $f_o$ is the insonifying frequency of each of said at least two differently angled diffracted ultrasonic beams, $\theta_1$ is the angle of one said at least two differently angled diffracted ultrasonic beams, $\theta_3$ is the angle of the other said at least two differently angled diffracted ultrasonic beams, v is said velocity of said fluid and $\alpha$ is the angle of said velocity of said fluid relative to said transducer.

8. The method according to claim 7, wherein said velocity v is determined according to the equation:

$$v = \frac{c}{2} \frac{\sqrt{(2\cos\theta_1 fd_3 fd_1 \cos\theta_3 + fd_3^2 + fd_1^2 - 2\sin\theta_1 fd_3 fd_1 \sin\theta_3)}}{f_o(\sin\theta_3\cos\theta_1 + \cos\theta_3\sin\theta_1)}.$$

9. The method according to claim 7, wherein said angle $\alpha$ of said velocity of said fluid relative to said transducer is determined according to the equation:

$$\alpha = \arctan \frac{(-\sin\theta_1 fd_3 + fd_1 \sin\theta_3)}{(\cos\theta_1 fd_3 + fd_1 \cos\theta_3)}.$$

10. An ultrasonic transducer apparatus for measuring the velocity of a fluid flowing through a lumen, comprising:

an ultrasonic transducer of a predetermined order greater than 1, said transducer having a diffracting structure, said diffracting structure arranged in a repeating pattern of a given repeat pattern distance; and pulse generating means for driving said transducer at a given frequency and phase angle to cause said transducer to transmit at least two differently angled diffracted ultrasonic beams, whereby said ultrasonic beams are used by said ultrasonic transducer apparatus to measure the velocity of the fluid.

11. The ultrasonic transducer apparatus according to claim 10, wherein said diffracting structure is integrally formed with said transducer, said repeating pattern including a linear array of vibrating elements for transmitting said diffracted ultrasonic beams.

12. The ultrasonic transducer apparatus according to claim 11, wherein said vibrating elements are fabricated from a piezoelectric material.

13. The ultrasonic transducer apparatus according to claim 10, wherein said ultrasonic traducer produces said at least two differently angled diffracted ultrasonic beams according to a sinusoidal function proportional to said predetermined order of said transducer.

14. The ultrasonic transducer apparatus according to claim 10, wherein said ultrasonic transducer produces said at least two differently angled diffracted ultrasonic beams according to the equation:

$$\sin\theta = n\lambda/d,$$

where $\theta$ is the desired angle of each of said at least two differently angled beams, n is said order of said transducer, $\lambda$ is the wavelength of each of said at least two differently angled beams, and d is said given repeat pattern distance.

15. The ultrasonic transducer apparatus according to claim 14, wherein n is equal to an odd number.

16. The ultrasonic transducer apparatus according to claim 14, wherein n is equal to 3.

17. The ultrasonic transducer apparatus according to claim 10, wherein said at least two differently angled diffracted ultrasonic beams are backscattered by said fluid to produce at least two Doppler shift frequencies.

18. The ultrasonic transducer apparatus according to claim 17, wherein one of said at least two Doppler shift frequencies is calculated according to the equation:

$$fd_1 = 2f_o/c \; v \; \cos(90° - \theta_1 - \alpha)$$

and the other of said two Doppler shift frequencies is calculated according to the equation:

$$fd_3 = 2f_o/c \; v \; \cos(90° - \theta_3 + \alpha)$$

where c=the velocity of sound, and $f_o$ is the insonifying frequency of each of said at least two differently angled diffracted ultrasonic beams, $\theta_1$ is the angle of one said at least two differently angled diffracted ultrasonic beams, $\theta_3$ is the angle of the other said at least two differently angled diffracted ultrasonic beams, v is said velocity of said fluid and $\alpha$ is the angle of said velocity of said fluid relative to said transducer.

19. The ultrasonic transducer apparatus according to claim 18, wherein said velocity v is determined according to the equation:

$$v = \frac{c}{2} \frac{\sqrt{(2\cos\theta_1 fd_3 fd_1 \cos\theta_3 + fd_3^2 + fd_1^2 - 2\sin\theta_1 fd_3 fd_1 \sin\theta_3)}}{f_o(\sin\theta_3\cos\theta_1 + \cos\theta_3\sin\theta_1)}.$$

20. The ultrasonic transducer apparatus according to claim 18, wherein said angle $\alpha$ of said velocity of said fluid relative to said transducer is determined according to the equation:

$$\alpha = \arctan \frac{(-\sin\theta_1 fd_3 + fd_1 \sin\theta_3)}{(\cos\theta_1 fd_3 + fd_1 \cos\theta_3)}.$$

21. An ultrasonic transducer comprising:

a planar substrate member fabricated from a piezoelectric material;

a linear repeating pattern of polarized vibrating elements fabricated from a piezoelectric material, said repeating pattern having a predetermined repeat pattern distance, said vibrating elements being disposed upon a surface of said planar substrate member, said vibrating elements forming a diffracting structure of a predetermined order greater than 1.

22. The ultrasonic transducer according to claim 21, wherein said piezoelectric plastic of said substrate member comprises PVF2 piezoelectric plastic.

23. The ultrasonic transducer according to claim 21, wherein said piezoelectric plastic of said linear array of alternately polarized vibrating elements comprises PVF2 piezoelectric plastic.

24. The ultrasonic transducer according to claim 21, wherein said ultrasonic transducer produces said at least two differently angled diffracted ultrasonic beams according to a sinusoidal function proportional to said predetermined order of said transducer.

25. The ultrasonic transducer apparatus according to claim 21, wherein said ultrasonic transducer produces said at least two differently angled diffracted ultrasonic beams according to the equation:

$$\sin\theta = n\lambda/d,$$

where $\theta$ is the desired angle of each of said at least two differently angled beams, n is said order of said transducer, $\lambda$ is the wavelength of each of said at least two differently angled beams, and d is said given repeat pattern distance.

26. The ultrasonic transducer according to claim 25, wherein n is equal to an odd number.

27. The ultrasonic transducer according to claim 25, wherein n is equal to 3.

* * * * *